United States Patent [19]

Silverstein

[11] Patent Number: 5,000,810

[45] Date of Patent: Mar. 19, 1991

[54] DECORATIVE OR PRINTED LAMINATES AND METHODS FOR MAKING SAME

[75] Inventor: Michael A. Silverstein, Fort Lee, N.J.

[73] Assignee: Custom Laminations, Inc., Paterson, N.J.

[21] Appl. No.: 344,419

[22] Filed: Apr. 25, 1989

Related U.S. Application Data

[63] Continuation of Ser. No. 84,401, Aug. 10, 1987, abandoned.

[51] Int. Cl.$^5$ .................... B44C 1/165; B32B 31/000
[52] U.S. Cl. .................... 156/238; 156/239; 156/249; 156/289; 428/204; 428/918
[58] Field of Search ............ 156/238, 240, 241, 230, 156/247, 249, 289, 242, 246, 306.6, 306.9, 307.3, 307.4, 307.5, 344; 283/901; 264/557, 558; 428/40, 41, 42, 352, 343, 354, 202, 203, 204, 205, 918; 427/208.4, 208.8

[56] References Cited

U.S. PATENT DOCUMENTS

| | | | |
|---|---|---|---|
| 2,559,649 | 7/1951 | Little et al. .......................... | 156/238 |
| 3,278,365 | 10/1966 | Adams . | |
| 3,620,366 | 11/1971 | Parkinson et al. . | |
| 3,871,907 | 3/1975 | Burton et al. . | |
| 4,082,873 | 4/1978 | Williams ............................. | 428/202 |
| 4,284,681 | 8/1981 | Tidmarsh et al. . | |
| 4,322,461 | 3/1982 | Raphael et al. .................. | 156/306.6 |
| 4,378,392 | 3/1983 | Segel .................................... | 156/249 |
| 4,582,554 | 4/1988 | Bell et al. ........................... | 156/246 |
| 4,624,875 | 11/1986 | Watanabe et al. ................. | 156/249 |
| 4,650,704 | 3/1987 | Rothenberg ....................... | 156/344 |
| 4,759,816 | 7/1988 | Kasper et al. ...................... | 156/246 |

FOREIGN PATENT DOCUMENTS 3438489  5/1985  Fed. Rep. of Germany ...... 156/246

Primary Examiner—Michael W. Ball
Assistant Examiner—Louis Falasco
Attorney, Agent, or Firm—Lerner, David, Littenberg, Krumholz & Mentlik

[57] ABSTRACT

A surface laminate film ideally suited for application by lamination onto a substrate such as wall covering and a process for laminating said surface laminate film onto said paper substrate is disclosed. The surface laminate film comprises a polyvinylchloride film plasticized with a polymeric plasticizer and combined with an acrylic adhesive. The adhesive should most ideally be an acrylic adhesive.

6 Claims, 1 Drawing Sheet

DECORATIVE OR PRINTED LAMINATES AND METHODS FOR MAKING SAME This is a continuation of application Ser. No. 07/084,401, filed Aug. 10, 1987, now abandoned.

FIELD OF THE INVENTION

This invention relates in general to composite materials or laminates. Particularly, this invention relates to decorative composite materials or laminates adopted for use in wall coverings, lamp shades, menus, window blinds, pamphlets, printed substrates of continuous length, items printed with Webb equipment, and the like. Still more particularly, the invention relates to a wall covering substrate laminated with a plasticized film contributing to the durability and stain resistance of the wall covering.

BACKGROUND OF THE INVENTION

The use of composite materials or laminates such as wall coverings as decorations for interior walls is long extant. In fact, wall coverings can be seen in revolutionary war era homes. Traditionally, the use of such wall coverings was associated with quite cumbersome installation. Once the wall covering was actually in place, it often became stained and showed other aspects of wear. Many developments in the wall covering art, particularly relating to plastic wall coverings, have attempted to address these problems. However, none of these attempts has been applicable to non-textured, wall covering substrate without considerable, undesirable characteristics being associated therewith.

Modern wall coverings are quite complex in their composition when compared to the wall coverings used in the past. For instance, modern wall coverings are frequently paperbacked colored PVC film or duplex paper (double paper layer) to prevent bleed-through of an adhesive used to bind the wall covering to a wall or other interior surface. The duplex wall covering also adds dimensional strength to the material, i.e. adds a certain degree of stiffness, providing for greater ease of installation. Paperbacking also insures proper drying of the installation adhesive especially on materials that are non-porous, i.e. materials commonly used in wall coverings such as polyvinylchloride (PVC) film. Still another reason for the increased use of duplex materials is that the paperbacking has great benefit in hiding any imperfections on the wall that would tend to pattern or cause an irregular surface on the face of the wall covering subsequent to installation. Also, should removal of the wall covering be desired, duplex materials facilitate wall covering removal because a thin layer of paper remains on the wall preventing any damage that may occur to a plaster wall or other wallboard upon wall covering removal. Therefore, materials comprised as a duplex structure are particularly suitable for use as a wall covering.

Certain problems are particularly unique to printed wall coverings. Although such wall covering grounds (that is, the material to be printed on or a wall covering without printing) may be washable, such as paperbacked PVC, once the wall covering is imprinted with a pattern, it is substantially less resistant to stains. This decrease in stain resistance is more or less proportional to the amount of print coverage on the wall covering. Therefore, the more ink or print coverage on the wall covering, the less washable and stain resistant is the wall covering.

A large number of laminate films and film adhesives are known in the wall covering art. Various combination of such films and adhesives have been used in the manufacture of wall coverings. However, as reviewed above, problems with certain of these adhesives and films in combination have been apparent. One of the significant difficulties in combining laminate films and adhesives is the unpredictability of commercially important traits of the film and adhesive after being combined. There is no known way to predict if the combination of a film having desired characteristics and an adhesive having desired characteristics will yield a film/adhesive combination with desirable characteristics. An example of this unpredictability can be seen in the use of polyvinylchloride having polymeric plasticizer and polyvinylchloride having monomeric plasticizer. When examined alone, i.e. not in combination with an adhesive, both types of PVC would appear to have similar characteristics and provide similar utility. However, these PVC's behave differently when combined with different types of adhesive.

When determining which adhesive manifests the appropriate characteristics desirable for combining with laminate films, it is common to examine clarity of the dried adhesive on light and dark colored surfaces, resistance to light (UV light in particular), ability to stick to non-porous surfaces, as well as other qualitative characteristics such as peel and sheer. Different characteristics are significant when selecting an appropriate film laminate for the combination. Among the parameters which must be evaluated in film and adhesive selection are clarity, lay flat, adhesion, foldability, and color fastness.

It will be appreciated that many of these criteria are qualitative. For instance, a certain degree of yellowing may be acceptable if it is essentially imperceptible when the wallpaper is on the wall. Similarly, the precise degree of lay flat or memory acceptable is a qualitative determination made by the manufacturer. However, there certainly reaches a point at which all manufacturers would agree that a wall covering exhibits characteristics that are quite unacceptable as to each of the aforedesignated parameters. As used herein, the following definitions are provided for these qualitative characteristics.

"Clarity" is essential when laminating a clear surface laminate film onto a wall covering substrate. Lack of clarity results in streaking, discoloration, and cloudiness which blur or otherwise distort the normal appearance of the wall covering. In addition, certain peculiar, undesirable side effects associated with clarity come into play regarding the use of certain colors in combination with certain adhesives. For instance, the use of an aqueous based adhesive when laminating a surface laminate film to navy blue paper causes accentuated discoloration probably because of solids in the adhesive. Also, different adhesives provide different degrees of clarity depending on the degree of darkness or lightness on the surface.

"Lay flat" is a descriptive term which characterizes the degree of resilient curl which a material possesses when it is unrolled or laid out on a flat surface. This characteristic is commonly found, for instance, in gift wrapping paper which when removed from a roll has a tendency to reform into a cylinder if not held in the flat position. A wall covering which has good lay flat will not curl. When unrolled and laid on a flat surface, wall covering exhibiting good lay flat has very limited tendency to curl. Good lay flat is very important in facilitating application of wall covering to an interior surface.

"Adhesion" defines the strength of bonding between two materials. The harder it is to separate or peel away two substrates, i.e. an adhesive and a surface laminate film, the greater is the adhesion. Adhesion has nothing to do with adhesive tackiness. An adhesive can be quite tacky and have poor adhesion.

Wall coverings must be foldable. "Foldability" characterizes the trait of a wall covering to fold whether inwardly (printed surface to printed surface) or outwardly (back to back.) When wall covering is folded, it should fold with equal facility either inwardly or outwardly. However, when making such folds, the wall covering should not wrinkle or show damage along the fold but rather fold sharply and crisply so, for instance, it can be wrapped around corners of a wall without adversely affecting the appearance of the wall covering.

"Color fastness" refers to the ability of surface laminate films and adhesives to not interfere with the high quality color characteristics of the wall covering. Oftentimes, colors will run, blur, show different colorations, or otherwise have their appearance altered in the course of the processing necessary to bind a clear surface laminate film/adhesive combination to the wall covering substrate.

"Migration" refers to movement of plasticizer out of the laminant film. It is common for the plasticizer used in the surface laminate film to migrate through the layers of the lamination causing an undesirable appearance. Most commonly, this occurs when plasticizer migrates into the adhesive. One manifestation of such a migration is the delamination of surface laminant film, while plasticizer migration into an adhesive may result in surface laminate film shrinkage and adhesive spoilage.

Selection of the proper plasticizers, e.g. whether polymeric or monomeric, is important. Generally plasticizers have a tendency to migrate out of film causing film shrinkage. This is especially disadvantageous if shrinkage occurs after application of the wall covering to an interior surface. The result is seam separation and other irregularities on the wall covering. Plasticizers can migrate into the adhesive causing the adhesive to become softer and stickier, both undesirable traits. Moreover, plasticizer migration into the adhesive accelerates the aforementioned shrinking problem because the softer adhesive creates a less viscous medium in which the film can move and therefore the speed of shrinking is not inhibited. In aging tests conducted in conjunction with this invention, it was shown that polymeric plasticizers combined with surface laminate films showed no negative migration results after three months at conditions of 105° Fahrenheit and 85% humidity. Such was not the case when monomeric plasticizers were used. Use of monomeric plasticizers revealed unacceptable migration characteristics.

Acrylic adhesives were found to be the adhesive of choice especially in surmounting clarity problems. When water disbursed adhesives were used, they were generally unsatisfactory especially with regard to clarity on dark colored wall covering surfaces.

As previously noted, the characteristics which will result from a combination of a particular laminate film and a particular adhesive are unpredictable even when the characteristics of such film and adhesive alone are known. For instance, polyvinylchloride with monomeric plasticizer and polyvinylchloride with polymeric plasticizer would appear to be acceptable laminate films in all significant characteristics. Both have desirable lay flat, memory, pliability, foldability, clarity, scratch resistance, surface porosity, surface bondability, stretchability, and reaction to heat. It would thus appear that polyvinylchloride film with both monomeric and polymeric plasticizer is an ideal film. However, when these films are combined with adhesives manifesting the appropriate, desirable characteristics of, for instance, clarity on colored surfaces, peel, ability to bind to non-porous surfaces, sheer, and UV resistance each film performs differently.

It is, therefore, an object of this invention to create a composite material or laminate, e.g. wall covering, or the like, having desirable wear and stain resistant characteristics.

It is another object of this invention to provide a means for achieving desired durability and wipability of wall covering substrates while simultaneously providing an economically and commercially feasible process.

The combination of film and adhesive which manifested the commercially desirable characteristics was the combination using PVC polymeric plasticized film and acrylic adhesive. This particular combination, not others, overcomes the aforediscussed difficulties. By this combination, the instant invention provides for much greater stain resistance, washability and wearability of wall covering substrates. This has been accomplished while preserving all the beneficial aspects of duplex wall covering. Moreover, the particular process used provides results which cannot be had with numerous other combinations of clear films and adhesives.

SUMMARY OF THE INVENTION

The instant invention provides for a paper substrate composite material or laminate, e.g. wall covering, window blinds, or the like having a surface laminate film which serves to protect the composite material or laminate thereby providing increased durability and wipability and generally increased wear.

A wall covering substrate in accordance with this invention comprises a polyvinylchloride film plasticized with a polymeric plasticizer and combined with an acrylic adhesive. This combination of adhesive, plasticizer, and polyvinylchloride film is laminated onto a non-textured, wall covering substrate resulting in the wall covering having a clear surface laminate film.

A surface laminate film is also taught by this invention. The surface laminate film comprises a polyvinylchloride film plasticized with a polymeric plasticizer. The polymeric plasticized polyvinylchloride film is combined with an acrylic adhesive. This surface laminate film, which often includes an easy release paper, can be laminated onto a wall covering.

A process utilizing a surface laminate film is also taught by this invention. The process is for applying a surface laminate film to a wall covering for the purposes of achieving increased durability and wipability. In accordance with this process, an acrylic adhesive is applied to release paper so that the release paper becomes coated with the acrylic adhesive. By a first lamination step, the acrylic coated release paper is laminated to a polymeric, plasticized, polyvinylchloride film. The release paper is next released from the acrylic coated polyvinylchloride film and combined by a second lamination step to a non-textured, wall covering substrate.

Wall coverings having ink or similar type printings thereon especially benefit from this process.

Alternatively, the aforediscussed process for applying a surface laminate film to wall covering may be modified to eliminate the need for release paper. Such a release process comprises coating an acrylic adhesive at a first predetermined temperature and a first predetermined pressure onto a non-textured, wall covering substrate to form an adhesive coated wall covering. The acrylic adhesive coated wall covering is then cooled to a predetermined temperature at which lamination can occur. Lamination of a polyvinylchloride film plasticized with polymeric plasticizer occurs at a second predetermined pressure and a second predetermined temperature. It is currently preferred that the adhesive be a pressure-sensitive adhesive to maximize clarity. Also, the polyvinylchloride film should preferably be clear.

Also disclosed in this invention is a non-textured, paperbacked wall covering with a surface laminate film providing increased durability and wipability as the result of a particular lamination process. Such a lamination process involves the combining of a polyvinylchloride film plasticized with polymeric plasticizer and an acrylic adhesive. The acrylic adhesive should most preferably be clear.

BRIEF DESCRIPTION OF THE FIGURES

The above description, as well as further objects, features and advantages of the present invention will be more fully understood by reference to the following detailed description of the presently preferred, but nonetheless illustrative, wall covering in accordance with the present invention when taken in conjunction with the accompanying drawings, wherein.

DETAILED DESCRIPTION

Figure 1:
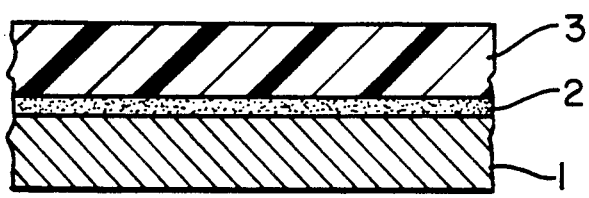
FIG. 1 is a cross sectional view of a wall covering substrate.

This invention concerns a clear surface film lamination process which results in a polymeric plasticized polyvinylchloride film applied to substrate such as paper, duplex paper, clay coated paper, paperbacked PVC ground, printed PVC, Tyvek®, brand spunbonded olefin fiber fabric non-textured, non-woven, and synthetic non-woven wall covering. This lamination process has been shown to increase the stain resistance or wipability and durability of a wall covering substrate. As will be evidenced below, many other combinations of adhesive, plasticizers, and plastics do not yield the beneficial characteristics which result from the combination of materials used in the instant product by the disclosed process. The process and products herein comprise an adhesive combined with a polyvinylchloride (PVC) film plasticized with polymeric plasticizer applied to a non-textured, wall covering substrate.

A schematic diagram of the use of the instant invention on wall covering is depicted in FIG. 1. FIG. 1 shows a wall covering substrate 1 which is bound by an adhesive 2 to a laminate film 3.

Critical to the success of creating a wall covering substrate such as a wall covering having characteristics which make it desirable to use and provide it with a high degree of durability and wipability is the use of a proper surface laminate film in combination with a proper adhesive. When a polyvinylchloride film plasticized with polymeric plasticizer was coated with an acrylic adhesive, the foregoing beneficial characteristics of durability and wipability were attained as were beneficial parameters relating to manufacture, installation and appearance of the wall covering. Specifically, the combination of PVC film plasticized with polymeric plasticizer and acrylic adhesive provided beneficial characteristics of clarity, lay flat, adhesion, inward folding, outward folding, color fastness, and plasticizer migration.

A number of different films and adhesives are theoretically useful to attain these desirable characteristics. However, many of these films and adhesives when combined proved not to be commercially viable. For instance, polyester, polypropylene, polyethylene, and polyurethane films were all shown to be unacceptable surface laminates. Polyethylene wa found to have a poor "memory," that is, it would not return to its original state after being stretched or otherwise having tension applied to it. Polyurethane, on the other hand, had too good a memory. When it was stretched, it snapped back causing wrinkling and smudging. Polypropylene, was found to have insufficient memory and to be excessively brittle. However, when a polyvinylchloride film with polymeric plasticizer was used, it possessed the desirable combination of characteristics for use with wall covering substrate when combined with an acrylic adhesive.

In the currently preferred embodiment, a clear polyvinylchloride film with excellent characteristics such as aforediscussed is used. A polymeric plasticizer is added prior to calendering of the film to create a flexible film. The plasticizer is required so that the laminate film can pass easily through webbed-type laminating equipment.

The surface laminate is combined with a polymeric plasticizer such as is known and available from Kalex Chemical Product, Inc. The adhesive is preferably a solvent adhesive and most preferably acrylic available from 3M. The use of an acrylic adhesive greatly expedites the commercial manufacture of the wall covering substrate of this invention.

A variety of processes are at hand to actually manufacture the instant wall covering substrate. All require a lamination step in which the polymeric, plasticized polyvinylchloride film coated with an acrylic adhesive is laminated to a wall covering substrate. In the currently preferred embodiment, the acrylic adhesive is coated onto a release paper. The use of a release paper or liner is advantageous because the polymeric, plasticized polyvinylchloride film may react adversely to the temperature required for acrylic adhesive coating. The release paper should be of the easy release variety being made of super calendered, semi-bleached craft paper having a solventless, silicone coating. A release paper which fulfills these requirements is known in the art.

The acrylic, adhesive coated release paper is laminated to the polymeric, plasticized polyvinylchloride film at a temperature, preferably at a warm temperature between 70°-100° F. but not warmer than 100° F. to avoid stretching the PVC film, and a pressure of 20-40 pounds per square inch, ideally at least 25 pounds per square inch, to assure uniform lamination and coating of the film by the acrylic-coated release paper. This combination of release paper, acrylic adhesive and polymeric plasticized polyvinylchloride film is then subjected to a second lamination. Immediately before the second lamination, the release paper is removed and the acrylic adhesive coated, polymeric plasticized polyvinylchloride film is laminated onto a wall covering substrate. This lamination can be accomplished with a lembo webb laminating machine. The acrylic coated surface laminate film should be heated to a temperature in the range of 90°–120° F. and most preferably to approximately 110° F. so that the acrylic pressure sensitive adhesive will become very aggressive. A separate rewinder on the laminate machine should be coordinated to proper speed for removal of the release liner. The coated film should then pass through a slightly gravure nip roller at 30 pounds of pressure per square inch to laminate the film onto the wall covering.

Alternatively, the process of manufacturing the instant wall covering can be accomplished without the use of a release liner. For example, in such a process, the acrylic adhesive could be directly coated onto the wall covering substrate. In another example, the acrylic adhesive coating is first applied to a wall covering substrate itself such as a nontextured, paper wall covering either printed or not printed. The substrate is then allowed to cool so that the acrylic adhesive is no longer as fluid as it is when applied and so that the acrylic adhesive is fixed to the wall covering substrate. At such time, the acrylic adhesive coated wall covering substrate can be laminated to a polyvinylchloride film plasticized with polymeric plasticizer. Regardless of the technique used, it will be understood by those skilled in the art that the acrylic coating step may be accomplished by commercial coating firms.

Several advantages are associated with the use of an acrylic coated release liner as opposed to directly coating the acrylic adhesive to a wall covering substrate. Each wall covering possesses variable parameters such as degree of printing and color such that a specific calculation would need be done prior to the application of the acrylic coating directly to the wall covering without release paper. Similarly, the release liner will have a more controlled and uniform coating surface as compared to the paper substrate. Also, the acrylic adhesive can be coated to the release paper and stored for a considerable length of time prior to engaging the lamination steps. This is not so easily done with acrylic coated wall covering substrate. However, in the event that sufficiently large quantities of one type of wall covering is desired, many of these disadvantages will be overcome.

It will be understood that the embodiments described herein are merely exemplary and that a person skilled in the art may make many variations and modifications without departing from the spirit and scope of the invention. All such modifications and variations are intended to be included from the scope of the invention as defined in the appended claims.

What is claimed is:

1. A process for forming a laminate comprising:
   laminating release paper coated with a pressure sensitive acrylic adhesive to a clear polyvinyl chloride film plasticized with a polymeric plasticizer, so that a lamination of a release paper, adhesive and film is formed;
   removing said release paper from said lamination so as to provide said polyvinyl chloride film with a pressure sensitive acrylic adhesive coating;
   providing a paper wall covering web, having a front side bearing a printed design and a back side that is subsequently affixed to a surface to be covered; and
   laminating said pressure sensitive acrylic adhesive coated, polyvinyl chloride film to said front side of said wall covering web,
   whereby said laminate is resistant to migration of said plasticizer from said film to said front side of said wall covering web.

2. The process of claim 1 wherein said pressure sensitive acrylic adhesive is transparent.

3. The process of claim 1 wherein said pressure sensitive acrylic adhesive coated, polyvinyl chloride film is laminated to said front side of said wall covering web at at least 30 lbs. of pressure per square inch and a temperature in the range of between 90°–120° F.

4. A process for forming a laminate comprising:
   providing a paper wall covering web having a front side bearing a printed design and a back side that is subsequently affixed to a surface to be covered;
   coating a pressure sensitive acrylic adhesive at a first predetermined temperature at which said adhesive is fluid, and a first predetermined pressure on to said front side of said wall covering web so that said front side of said web is provided with a pressure sensitive acrylic adhesive coating;
   cooling said adhesive coating on said front side of said web so that said adhesive coating is no longer fluid; and
   laminating at a second predetermined pressure and at a second predetermined temperature said front side of said pressure sensitive acrylic adhesive coated wall covering web to a clear polyvinyl chloride film plasticized with polymeric plasticizer,
   whereby said laminate is resistant to migration of said plasticizer from said film to said front side of said wall covering web.

5. The process of claim 4 wherein said pressure sensitive acrylic adhesive is transparent.

6. A process for forming a laminate comprising:
   laminating release paper coated with a pressure sensitive acrylic adhesive to a polyvinyl chloride film plasticized with a polymeric plasticizer, so that a lamination of release paper, adhesive and film is formed;
   removing said release paper from said lamination so as to provide said film with a pressure sensitive acrylic adhesive coating;
   providing a paper wall covering web, having a front side bearing a printed design and a back side that is subsequently affixed to a surface to be covered;
   laminating said pressure sensitive acrylic adhesive coated film to said front side of said wall covering web at a pressure of at least 30 lbs. per square inch at a temperature in the range of between about 90° and about 120° F.;
   whereby said laminate is resistant to migration of said plasticizer from said film to said front side of said wall covering web.

* * * * *